(12) United States Patent
Sureshchandra et al.

(10) Patent No.: US 9,137,124 B2
(45) Date of Patent: Sep. 15, 2015

(54) SYSTEM, METHOD AND COMPUTER PROGRAM PRODUCT FOR SERVING AN APPLICATION FROM A CUSTOM SUBDOMAIN

(71) Applicant: salesforce.com, inc., San Francisco, CA (US)

(72) Inventors: Jayesh Sureshchandra, San Francisco, CA (US); Peter Dapkus, Lafayette, CA (US); Aaron Fiske, San Francisco, CA (US); Nikita Prokopev, San Francisco, CA (US); Ryan Guest, Stockton, CA (US); Addison Luh, Union City, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 14/173,754

(22) Filed: Feb. 5, 2014

(65) Prior Publication Data

US 2014/0156794 A1 Jun. 5, 2014

Related U.S. Application Data

(63) Continuation of application No. 13/048,807, filed on Mar. 15, 2011, now Pat. No. 8,688,802.

(60) Provisional application No. 61/314,003, filed on Mar. 15, 2010.

(51) Int. Cl.
*G06F 15/16* (2006.01)
*H04L 12/24* (2006.01)
*H04L 29/08* (2006.01)
*H04L 29/12* (2006.01)

(52) U.S. Cl.
CPC .............. *H04L 41/50* (2013.01); *H04L 61/305* (2013.01); *H04L 67/16* (2013.01); *H04L 61/1511* (2013.01)

(58) Field of Classification Search
USPC .................... 709/217, 223, 225, 226, 245
See application file for complete search history.

(56) References Cited

U.S. PATENT DOCUMENTS

| | | |
|---|---|---|
| 5,577,188 A | 11/1996 | Zhu et al. |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |

(Continued)

*Primary Examiner* — Liangche A Wang
(74) *Attorney, Agent, or Firm* — Zilka-Kotab, PC

(57) ABSTRACT

In accordance with embodiments, there are provided mechanisms and methods for serving an application from a custom subdomain. These mechanisms and methods for serving an application from a custom subdomain can enable improved data security, enhanced system performance, optimized resource utilization, etc.

18 Claims, 4 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,039 B2 | 8/2010 | Weissman et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0078233 A1* | 6/2002 | Biliris et al. ............... 709/238 |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0073691 A1* | 4/2004 | Sun ............................ 709/230 |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0223022 A1 | 10/2005 | Weissman |
| 2006/0021019 A1 | 1/2006 | Hinton et al. |
| 2007/0043846 A1* | 2/2007 | Grayson et al. ............... 709/223 |
| 2008/0249972 A1 | 10/2008 | Dillon |
| 2008/0307049 A1* | 12/2008 | Curran et al. ............... 709/203 |
| 2008/0307085 A1* | 12/2008 | Curran et al. ............... 709/223 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0162414 A1* | 6/2010 | Medvinsky ..................... 726/31 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |

* cited by examiner

SYSTEM, METHOD AND COMPUTER PROGRAM PRODUCT FOR SERVING AN APPLICATION FROM A CUSTOM SUBDOMAIN

CLAIM OF PRIORITY

This application is a continuation of U.S. application Ser. No. 13/048,807, filed Mar. 15, 2011, which claims the benefit of U.S. Provisional Patent Application 61/314,003, filed Mar. 15, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to serving applications, and more particularly to establishing custom subdomains for serving applications.

BACKGROUND

The subject matter discussed in the background section should not be assumed to be prior on merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventional systems commonly utilize generic uniform resource locators (URLs) associated with an instance of the system in order to serve applications located within the system. For example, when a user signs into an organization of the system, they may be sent to an address of an instance on which the organization resides. Unfortunately, techniques for utilizing generic URLs to serve system applications have been associated with various limitations.

Just by way of example, security issues (e.g., the use of hijacked cookies to access unauthorized system organizations, etc.) may exist with traditional methods of utilizing generic URLs to serve system applications. Additionally, when the location at which an organization resides is changed (e.g., due to space constraints, etc.), a new generic URL may be required, which may result in broken links associated with applications of the organization. Accordingly, it is desirable to optimize the use of URLs to serve applications within the system.

BRIEF SUMMARY

In accordance with embodiments, there are provided mechanisms and methods for serving an application from a custom subdomain. These mechanisms and methods for serving an application from a custom subdomain can enable improved data security, enhanced system performance, optimized resource utilization, etc.

In an embodiment and by way of example, a method for serving an application from a custom subdomain is provided. In one embodiment, a selection of a custom subdomain is received from an organization of a system. Additionally, the custom subdomain is associated with the organization of the system. Further, an application of the organization is served from the custom subdomain.

While one or more implementations and techniques are described with reference to an embodiment in which serving an application from a custom subdomain is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for serving an application from a custom subdomain.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for serving an application from a custom subdomain will be described with reference to example embodiments.

Figure 1:
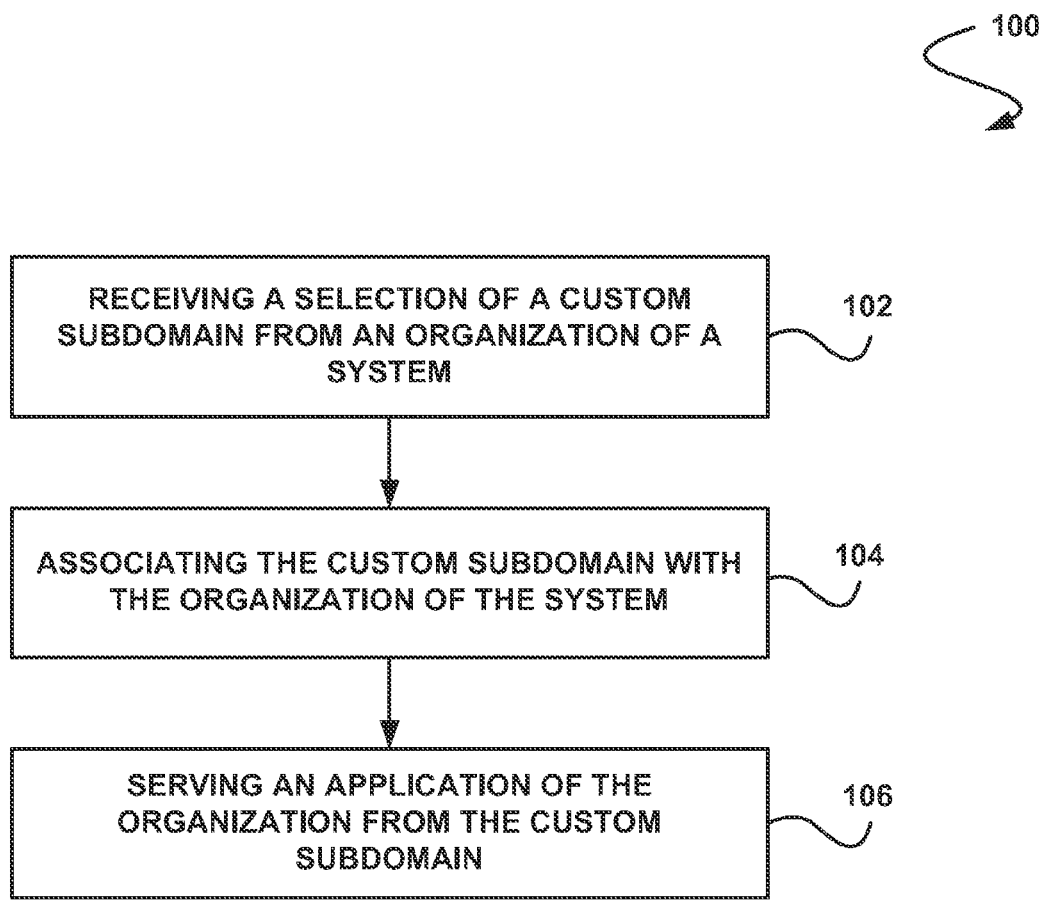
FIG. 1 illustrates a method for serving an application from a custom subdomain, in accordance with one embodiment.

FIG. 1 illustrates a method 100 for serving an application from a custom subdomain, in accordance with one embodiment. As shown in operation 102, a selection of a custom subdomain is received from an organization of a system. In one embodiment, the custom subdomain may include any domain that is part of a larger domain of the system. For example, for a system domain named "system.com," a custom subdomain named "custom" may be selected such that the full domain name is "custom.system.com."

In another embodiment, the custom subdomain may be selected utilizing one or more resources of the system. For example, the custom subdomain may be selected utilizing a set up page provided by the system. In yet another embodiment, the custom subdomain may be associated with a name of the organization. For example, the organization may select the name of the organization as the custom subdomain.

Additionally, in one embodiment, the organization may include any entity associated with the system. For example, the organization may include a tenant of the system, a client of the system, etc. In another embodiment, the organization may include an individual, a corporation, or any other entity. In yet another embodiment, the system may include a client, a server, a multi-tenant on-demand database system, etc.

Additionally, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Furthermore, as shown in operation 104, the custom subdomain is associated with the organization of the system. In one embodiment, the associating may be performed by the system. In another embodiment, the associating may include checking the availability of the custom subdomain, confirming that the custom subdomain is not prohibited, etc. In yet another embodiment, the associating may include requesting a domain name system (DNS) alias from the selected custom subdomain to a location within the system. In still another embodiment, the custom subdomain may be associated with an instance of the organization within the system. Of course, however, the custom subdomain may be associated with the organization of the system in any manner.

Further still, as shown in operation 106, an application of the organization is served from the custom subdomain. In one embodiment, the application of the organization may be web-based. For example, the application of the organization may be accessed via the Internet. In another embodiment, the application of the organization may be accessed by inputting into a browser a full uniform resource locator (URL) for the application including the custom subdomain. For example, if the system domain is named "system.com," and the custom subdomain named is named "custom," then the application may be accessed by entering the URL "custom.system.com" into a web browser.

In one embodiment, the custom subdomain may replace an instance specific subdomain. For example, the organization named "organization" may reside on an instance of the system labeled "NA1," and the application of the organization may originally be served from the instance specific subdomain "NA1.system.com." However, after selecting the custom subdomain of "organization," the application of the organization may be served from the custom subdomain of "organization.system.com." In this way, one or more users may log into different organizations that reside on the same instance of the system at the same time. Additionally, the custom subdomain may enable the organization to migrate from one instance of the server to another instance in a manner that is transparent to users of the application (e.g., without resulting in broken application links, etc.).

Further, in one embodiment, one or more authentication elements (e.g., web browser cookies, etc.) may be assigned to the custom subdomain. In this way, scripting problems and cookie hijacking may be avoided, thereby increasing system security. In another embodiment, the system may identify the organization based on a URL submitted to the system that includes the custom subdomain. In this way, the organization may be identified earlier in the application service process, and network traffic, system resources, and other elements may be managed more efficiently.

Figure 2:
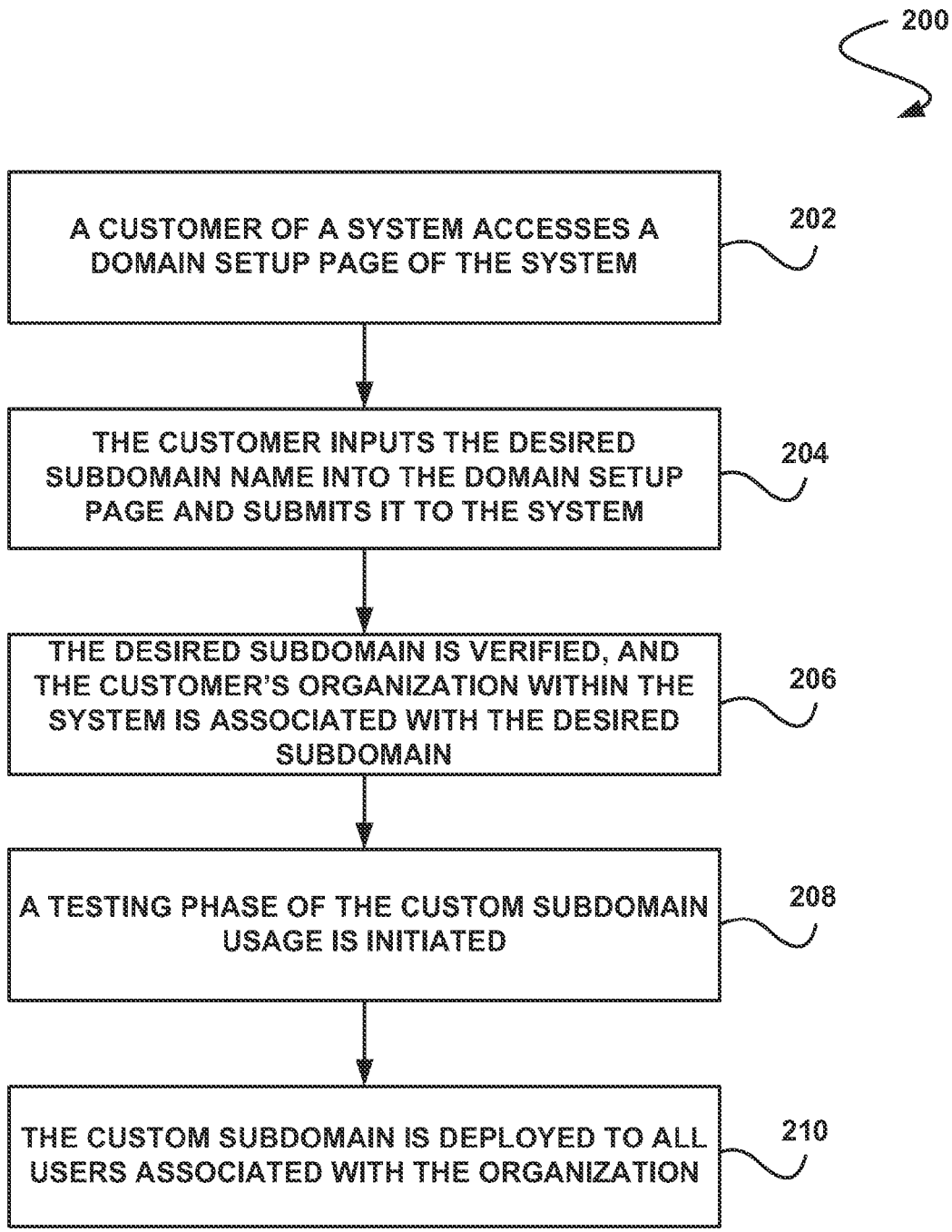
FIG. 2 illustrates a method for establishing a custom subdomain, in accordance with another embodiment.

FIG. 2 illustrates a method 200 for establishing a custom subdomain, in accordance with another embodiment. As an option, the present method 200 may be carried out in the context of the functionality of FIG. 1. Of course, however, the method 200 may be carried out in any desired environment. The aforementioned definitions may apply during the present description.

As shown in operation 202, a customer of a system accesses a domain setup page of the system. In one embodiment, the customer of the system may include an organization registered within the system. In another embodiment, the domain setup page may include a web page accessible by the customer. In yet another embodiment, if an organization associated with the customer has an OrgDomain perm, there may be a new entry in a setup tree (e.g., under company information, etc.) that may be identified as custom domain. The new entry may present a user interface (UI) similar to a domain registration page of the system, and may allow the customer to pick a domain, check its availability, and then register it.

Additionally, as shown in operation 204, the customer inputs a desired subdomain name into the domain setup page and submits it to the system. Further, as shown in operation 206, the desired subdomain is verified, and the customer's organization within the system is associated with the desired subdomain. In one embodiment, the verification of the desired subdomain may include confirming the availability of the subdomain. For example, registration of the domain may be done via a system page which may validate that the desired subdomain is unique and not a prohibited domain.

In another embodiment, the customer may select a register/save icon, and an organization value may be committed, while an outbound message may be sent to create a canonical name (CNAME) record. For example, the custom subdomain may be stored as an organization value within the system, and the feature may be hidden behind a perm. In another example, once the customer registers the subdomain, a message may be added on an outbound messaging queue that may send a request to create a CNAME record. In yet another embodiment, the system may request a DNS alias from the desired subdomain to the location of the customer's organization within the system, and may confirm the propagation to DNS.

In still another embodiment, the customer may access the system via an instance URL, and may proceed to register their domain at which point the system may send a request to make the CNAME update. Additionally, some background polling of DNS may be performed by the system to ensure that the custom subdomain is truly accessible before switching. In another embodiment, the system may send customers a URL such as "mycompany.<instancename>.system.com" temporarily. In another embodiment, a message may be sent to an asynchronous queue that may check DNS in 24 hours and if the change is in, flip some bit on the organization that may indicated that redirection is an option. Otherwise, the message may be re-enqueued and checked again in another 24 hours. Further, in one embodiment, the selected subdomain may not be allowed to change once it is established for an organization.

In yet another embodiment, a proxy may be introduced that may sit in front of all instances of the system in a data center. The proxy may contain the logic to route a request to a specific instance so all organizations may be handled with a wildcard ANAME entry (e.g., "*.mycrm.com," etc.). In this way, the notion of instances may be abstracted away from customers. Additionally, a plurality of IPs may be freed up since instance VIPs may no longer be needed. Further, the proxy may route the request dynamically in a variety of ways. One option is if the proxy is squid, an external ACL helper written in Java, Perl or any other language may reload a config file containing all of the mappings during a predetermined time interval (e.g., every five minutes, etc.). When an organization domain is created/updated/deleted, an appserver may send a request to some service listing on the proxy box that may update the file.

Further still, as shown in operation 208, a testing phase of the custom subdomain usage is initiated. In one embodiment, users associated with the organization may still log in and access applications of the organization within the system utilizing a URL with an instance specific subdomain, but may also log in and access applications utilizing a URL with the custom subdomain.

Also, as shown in operation 210, the custom subdomain is deployed to all users associated with the organization. In one embodiment, all users associated with the organization may be directed to the URL with the custom subdomain when logging in to the system. For example, if an OrgDomains perm is enabled, the user may be redirected to the custom subdomain and a sid cookie may be set on that domain. In another embodiment, instance specific subdomains may still be supported after the custom subdomain is deployed to all users.

Additionally, in one embodiment, one or more security features may be implemented utilizing the custom subdomain. For example, users of the organization may be required to log in to the system utilizing a URL with the custom subdomain. In this way, security threats (e.g., phishing, etc.) may be avoided. In another example, the organization associated with a user may be determined from the URL the user uses to log in with. In this way, valid users may be verified more efficiently (e.g., from a list of users of the particular organization, etc.).

In yet another example, one or more actions may be performed on an organization-specific basis at a load balancer level of the system before it reaches the application tier. In this way, an attack on an organization within the system may be blocked before it reaches the application tier, thereby improving performance by avoiding expensive logins. In another example, users from one organization within the system may be prevented from using the login URL of another organization within the system. In yet another example, one or more entities may have policies that restrict outgoing network traffic based on the requested URL with a custom subdomain. In this way, only a single URL may need to be added to a whitelist, blacklist, IP restrictions, utilized for secure sockets layer (SSL) and security assertion markup language (SAML) sign on, etc.

Further, in one embodiment, the system may implement one or more optimizations utilizing the custom subdomain. For example, a lookup table may be used to indicate the location of each system organization, and the organization may be identified from the custom subdomain. In this way, cross-instance calls (e.g., that determine which instance is associated with the organization, etc.) may be avoided, thereby minimizing network traffic-intensive processing and increasing performance.

In another example, utilizing the custom subdomain of a requested URL, the organization may be identified, and the system may determine whether the organization has exceeded their bandwidth allowance before using bandwidth to log users of the organization into the system. In yet another example, a load balancer of the system may be informed of the organization to be accessed when a user attempts to log into the system utilizing the custom subdomain of a requested URL, and may determine an amount of generated traffic, provide special pages for login, etc. In another embodiment, branded login pages may be implemented for the organization, utilizing the custom subdomain.

Further still, in one embodiment, one or more cookies may be set on the system domain (e.g., oinfo, etc.) which may be used to profile users visiting system websites. This may be done after the user is authenticated and before they are redirected to the custom subdomain. In another embodiment, when an organization is migrated within the system, a CNAME update may be done to point the custom subdomain to the new instance. Additionally, the CNAME update may be built into a system migration tool so that it can be done programatically. In order to allow customers to log in during the 24 hr period that a DNS change may take to propagate, an instance specific subdomain URL (e.g., "companyname.<new instance name>.system.com," etc.) may be used. In another embodiment, organizations that have organization domains enabled may not be migrated.

In this way, security may be improved by allowing better use of a browser security model (e.g., for XSS or phishing, etc.). Additionally, transparent organization migration may be performed within the system (e.g., that doesn't need to account for instances within the system, etc.). Further, organization throttling may be improved within the system. Further still, branded login pages may be provided. Also, IP range enforcement may be supported prior to logging in. In addition, users may be able to log into multiple organizations within the system regardless of instance. Furthermore, SSO support may be better supported, and IP space may be freed up.

System Overview

Figure 3:
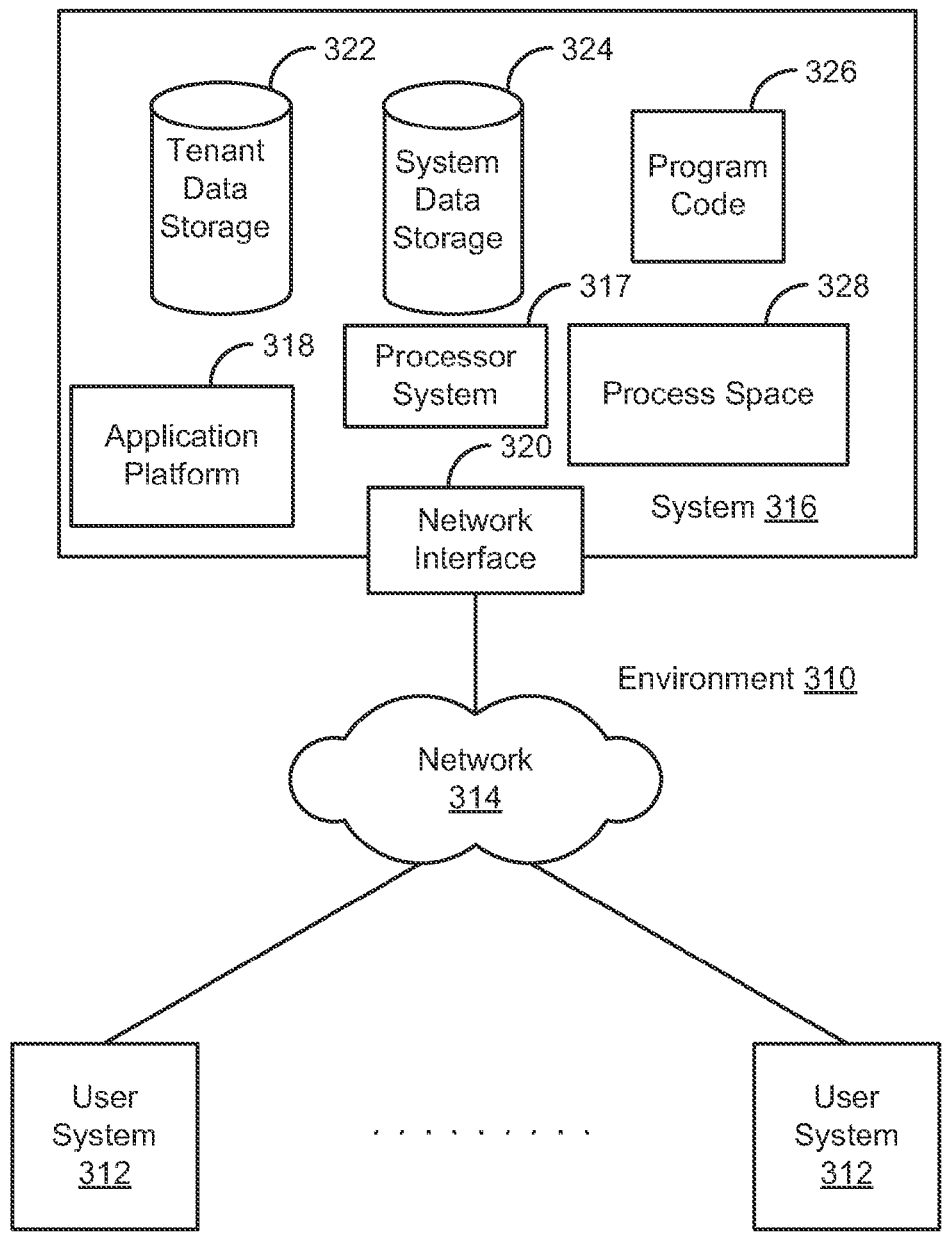
FIG. 3 illustrates a block diagram of an example of an environment wherein an on-demand database system might be used.

FIG. 3 illustrates a block diagram of an environment 310 wherein an on-demand database system might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database system exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database system, which is system 316.

An on-demand database system, such as system 316, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database system 316 may include an application platform 318 that enables creation, managing and executing one or more applications developed by the provider of the on-demand database system, users accessing the on-demand database system via user systems 312, or third party application developers accessing the on-demand database system via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application (s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
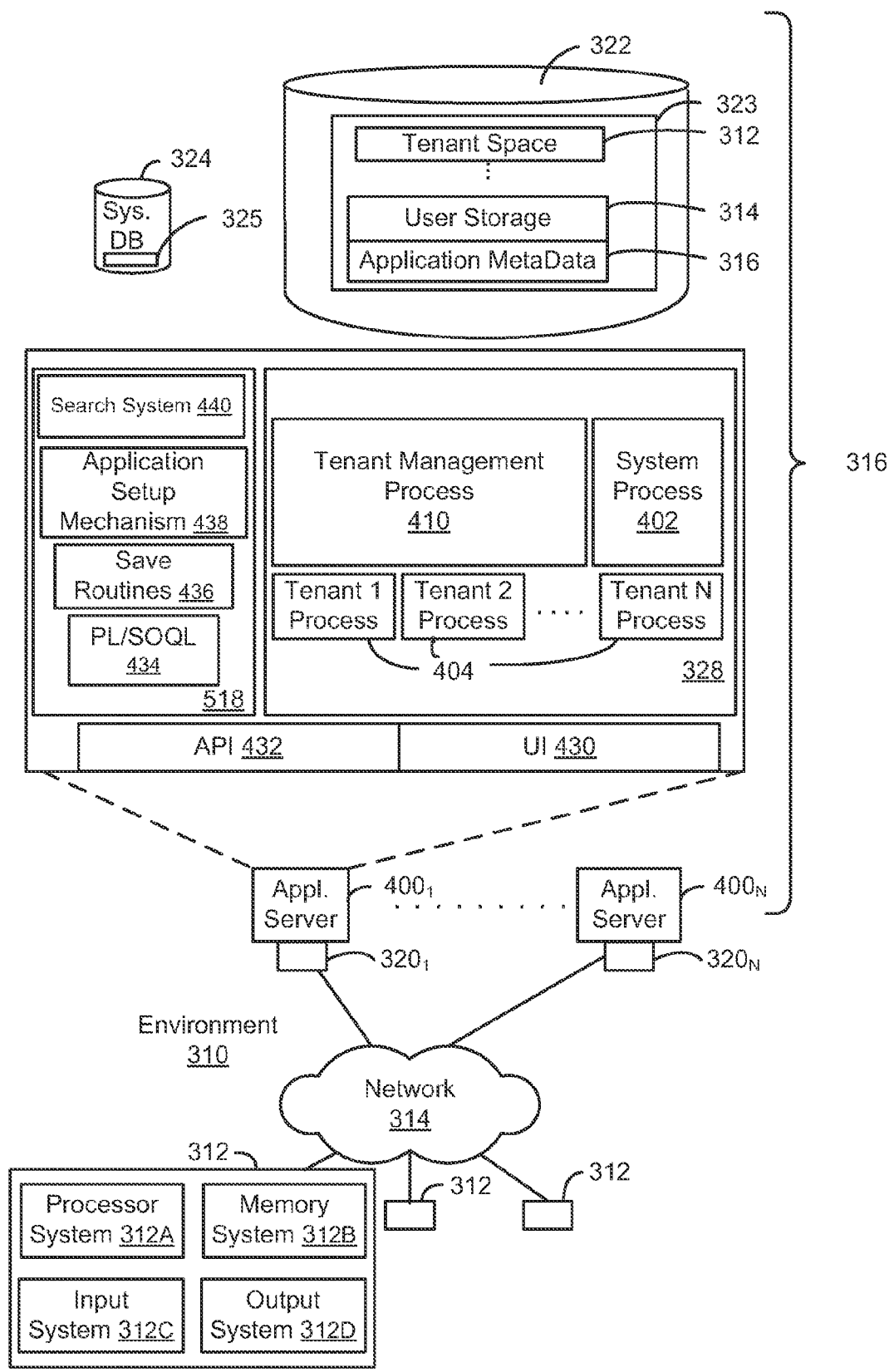
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level.

Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed by a computer to implement a method comprising:
   storing, by a system, a web application of each of a plurality of different organizations that have registered with the system;
   for each of the organizations:
      receiving, by the system from the organization, a name to be used to create for the organization a custom subdomain of a domain of the system,
      creating, by the system for the organization, the custom subdomain of the domain of the system using the name received from the organization,
      associating, by the system, the custom subdomain created for the organization with the web application of the organization, and
      serving, by the system, the web application of the organization via the custom subdomain.

2. The computer program product of claim 1, wherein the name for the custom subdomain is received utilizing a set up page provided by the system.

3. The computer program product of claim 1, wherein the associating is performed after checking an availability of the custom subdomain.

4. The computer program product of claim 1, wherein the associating includes confirming that the custom subdomain is not prohibited.

5. The computer program product of claim 1, wherein the associating includes requesting a domain name system (DNS) alias from the custom subdomain to a location within the system.

6. The computer program product of claim 1, wherein the custom subdomain is associated with an instance within the system.

7. The computer program product of claim 1, wherein the web application of the organization is served responsive to a user inputting into a browser a full uniform resource locator (URL) for the web application including the custom subdomain.

8. The computer program product of claim 1, wherein the computer program product is operable such that custom subdomain replaces an instance specific sub domain.

9. The computer program product of claim 1, wherein the computer program product is operable such that the custom subdomain enables the organization to migrate from one instance of the system to another instance in a manner that is transparent to users of the web application.

10. The computer program product of claim 1, wherein one or more authentication elements are assigned to the custom subdomain.

11. The computer program product of claim 1, wherein the computer program product is operable such that the system identifies the organization based on a URL submitted to the system that includes the custom subdomain.

12. The computer program product of claim 1, wherein the system includes a multi-tenant on-demand database system.

13. The computer program product of claim 1, wherein the organization includes a tenant of the system.

14. The computer program product of claim 1, wherein the custom subdomain is created to include the name and the domain.

15. The computer program product of claim 1, wherein the custom subdomain is a uniform resource locator (URL).

16. A method, comprising:
   storing, by a system, a web application of each of a plurality of different organizations that have registered with the system;
   for each of the organizations:
      receiving, by the system from the organization, a name to be used to create for the organization a custom subdomain of a domain of the system,
      creating, by the system for the organization, the custom subdomain of the domain of the system using the name received from the organization,
      associating, by the system, the custom subdomain created for the organization with the web application of the organization, and
      serving, by the system, the web application of the organization via the custom subdomain.

17. An apparatus, comprising:
   at least one processor of a system for:
      storing, by the system, a web application of each of a plurality of different organizations that have registered with the system;
      for each of the organizations:
         receiving, by the system from the organization, a name to be used to create for the organization a custom subdomain of a domain of the system,
         creating, by the system for the organization, the custom subdomain of the domain of the system using the name received from the organization,
         associating, by the system, the custom subdomain created for the organization with the web application of the organization, and
         serving, by the system, the web application of the organization via the custom subdomain.

18. A method for transmitting code for use in a multi-tenant database system on a transmission medium, the method comprising:
   transmitting code for storing, by a system, a web application of each of a plurality of different organizations that have registered with the system;
   for each of the organizations, transmitting code for:
      receiving, by the system from the organization, a name to be used to create for the organization a custom subdomain of a domain of the system,
      creating, by the system for the organization, the custom subdomain of the domain of the system using the name received from the organization,
      associating, by the system, the custom subdomain created for the organization with the web application of the organization, and
      serving, by the system, the web application of the organization via the custom subdomain.

* * * * *